July 24, 1928. Re. 17,046
W. G. HANCOCK ET AL
WAGON AND TRUCK DUMP
Original Filed Feb. 16, 1922
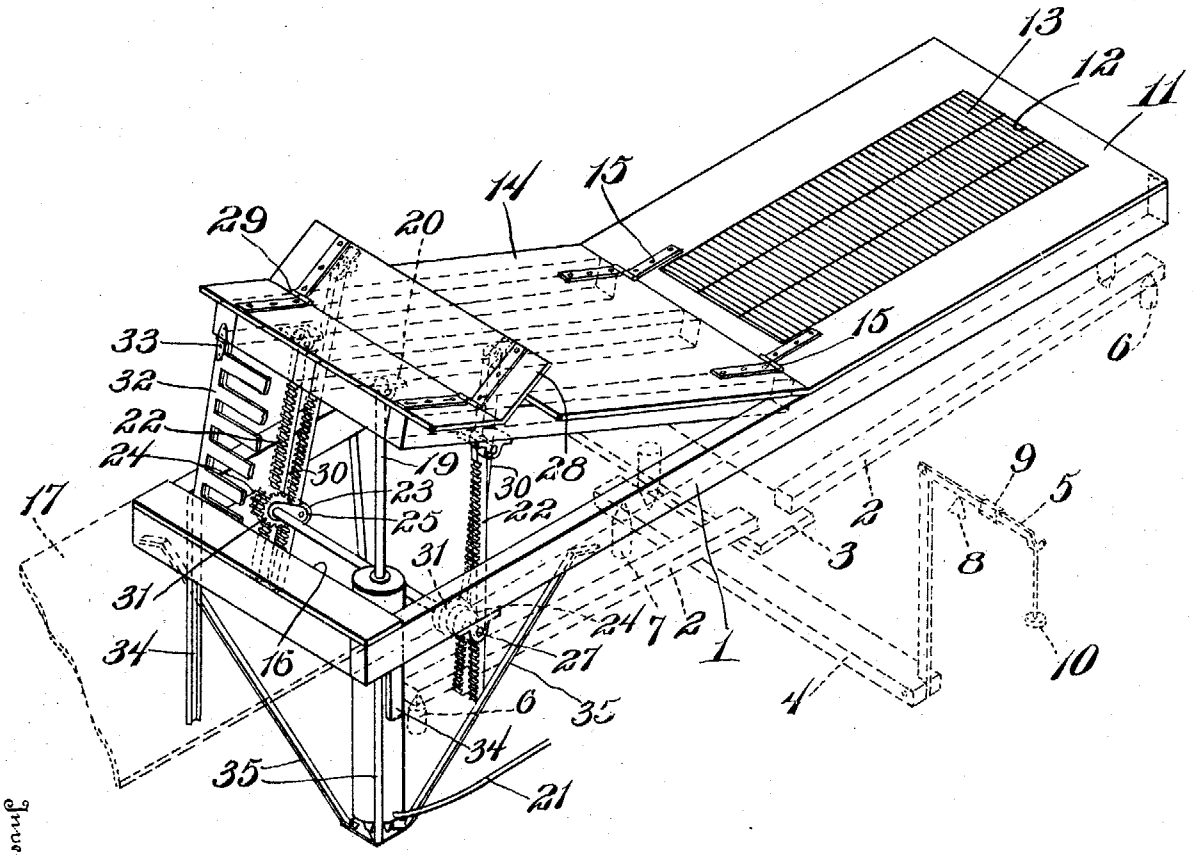
Inventors
W. G. Hancock
L. T. Stromswold
By Watson E. Coleman
Attorney Reissued July 24, 1928.

Re. 17,046

UNITED STATES PATENT OFFICE.

WILLIAM GEORGE HANCOCK AND LEONARD T. STROMSWOLD, OF MINOT, NORTH DAKOTA, ASSIGNORS TO MAGIC GRAIN DUMP COMPANY, OF MINOT, NORTH DAKOTA, A CORPORATION.

WAGON AND TRUCK DUMP.

Original No. 1,505,777, dated August 19, 1924, Serial No. 537,019, filed February 16, 1922. Application for reissue filed May 5, 1925. Serial No. 28,221.

Our invention relates to improvements in wagon and truck dumps, and it consists in the combinations, constructions, and arrangements herein described and claimed.

An object of our invention is to provide a wagon and truck dump which is mounted on a weighing scale and wherein means are provided to automatically lock the vehicle during a dumping operation.

A further object of our invention is to provide a device of the character described in which the wagon or truck elevating means is carried by the dump, thereby obviating the chance of slightly lifting the dump independently of the scale so as to lessen the weight of the truck upon the scales.

A further object of our invention is to provide a device of the character described in which the elevating platform of the dump is supported on each side thereof, thereby obviating a slight twisting or sagging of one side with respect to the other.

A further object of our invention is to provide a device of the character described in which a guard is carried by the elevating portion of the dump, the guard being adapted to close the opening between the raised end of the dump and the platform.

A further object of our invention is to provide a device of the character described which is relatively simple in construction, efficient for the purpose intended, and which is not likely to easily get out of order.

Other objects and advantages will appear in the following specification, and the novel features of the invention will be particularly pointed out in the appended claims.

Our invention is illustrated in the accompanying drawings, forming part of this application, in which the figure is a perspective view of the wagon and truck dump, showing the elevating platform in raised position.

In carrying out our invention, we provide a frame 1 which is carried by a weighing device of common construction, such as that shown by the dotted lines in the figure. It is obvious that the weighing means forms no part of our invention except in so far as it cooperates with the parts about to be described. We have shown the platform 1 as being supported by beams 2, which in turn rest upon a plank 3, the plank 3 being carried by a lever 4 which is operatively connected to a graduated bar or scale 5. The weight of the load upon the frame 1 will move the frame downwardly with respect to the supporting pins 6, 7, and 8, whereby the load may be weighed by means of the weights 9 and 10. A platform 11 covers a portion of the frame 1, and has a grain receiving opening 12 therein. The opening 12 is provided with an iron grate 13, or the like, so as to prevent objects, other than grain, from passing through the opening 12.

An elevating platform 14 is secured to the platform 11 by means of hinges 15, and is adapted to normally close the open end 16 of the frame 1. A stationary driveway or supporting board 17 is disposed adjacent to the end of the frame 1 which has the opening 16 therein. When the vehicle is drawn by draft animals, said animals will stand upon this driveway or supporting board 17 during the weighing operation so that only the wagon and its contents will be weighed.

The means for elevating the platform 14 about the hinges 15 comprises an air cylinder 18 and a piston having a piston rod 19, the piston being mounted in the cylinder 18. The cylinder 18 is secured to the frame 1 by means of supporting members 35. The under side of the platform 14 carries a bearing block 20 to which the rod 19 is pivotally secured. An air pipe 21, connecting with a source of supply (not shown), communicates with the lower end of the cylinder 18, and is adapted to convey the compressed air into the cylinder 18 so as to raise the rod 19, which in turn will raise or elevate the platform 14 about the hinges 15. A valve (not shown) controls the passage of air through the pipe 21. It will be observed from the figure that the sides of the platform 14 are prevented from sagging with respect to each other, since they are supported by racks 22, the racks being disposed between guide rollers 23 and pinions 24. The rollers 23 are carried by links 25, which in turn are carried by a transversely extending shaft 26. The shaft 26 is secured to the frame 1 by means of bearings 27. From this construction, it will be seen that when the rod 19 is moved, it will elevate the platform 14, which in turn will move the racks 22 with respect to the shaft 26. It will be noted, however, that the sides of the platform 14 are rigidly supported and cannot move with respect to each other, since the racks and pinions positively prevent this movement.

The platform 14 is provided with a front wheel locking means for the wagon or truck which is to be dumped. This means comprises a wheel locking board 28 which is hingedly secured to the platform 14 by means of hinges 29 and which forms a portion of the platform 14 when the latter is in closed or normal position. The board 28 is adapted to be swung about the hinges 29 when the platform 14 is elevated upwardly so that the board 28 will always be inclined at the same angle with respect to a perpendicular line drawn through the hinge as the platform 14 makes with the same perpendicular although this, at all times, is not necessary. The means for swinging the board 28 about the hinges 29 comprises a pair of racks 30 which are pivotally secured to the board 28, and which are disposed between the rollers 23 and pinions 31. It will be noted that the pinions 31, carried by the shaft 26, are adapted to rotate with the pinions 24. In other words, both of the pinions 24 and 31 are rotated as a unit when the platform 14 is elevated upwardly. The pinion 24 is smaller than the pinion 31, so that the rack 30 will be moved upwardly at a greater speed than is the rack 22. The greater movement imparted to the rack 30 will swing the board 28 about the hinges 29 so as to normally keep the board inclined from the vertical at the same angle as the platform 14 is inclined from the vertical, but in an opposite direction. In this manner, a trough or a V-shaped block is formed by the board 28 and the platform 14, and prevents the wheels of the wagon or truck from moving downwardly along the platform 14.

From the foregoing description of the various parts of the device, the operation thereof may be readily understood. Assume that a wagon is drawn upon the grain dump, and the horses are brought to a stop upon the supporting board 17. When the horses are supported by the board 17, the front wheels of the wagon will be positioned above the board 28. The wagon, with its contents, may now be weighed. After the wagon is weighed, it may be tilted so as to remove the grain therefrom, and to convey it through the opening 12. To accomplish the raising of the platform 14, air is admitted into the cylinder 18, which will raise the rod 19, which in turn will elevate the platform 14 upwardly. The shaft 26 and the racks and pinions will automatically keep the board 28 inclined at the desired angle, whereby the front wheels of the wagon are prevented from moving downwardly along the platform 14. The front end of the platform 14 carries a guard 32 which is hingedly secured thereto at 33, and which is guided at its lower end by channel irons 34, whereby the guard 32 operates effectively to hold the platform 14 against twisting or rotary stresses during the up and down movement of the platform. This guard closes the opening made between the frame 14 and the frame 11 when the frame 14 is in raised position, and prevents the horses from backing into the opening 16. After the contents of the wagon have been dumped, the air may be exhausted from the cylinder 18 which will lower the platform 14 to its normal position, and will swing the board 28 into a plane parallel with the plane of the platform 14. The same operation may be again repeated when it is desired to dump another wagon. In case a truck is desired to be dumped, it is brought upon the platforms 11 and 14 so that the front wheels thereof are disposed above the platform 28. The same operation is again repeated as heretofore described, and the truck is securely held from movement, when being dumped, by means of the board 28.

From the foregoing it will be observed that we have provided a simple and efficient device for automatically locking the wagon or truck against movement when the latter is being dumped. If the cylinder 18 was mounted upon a support instead of being carried by the frame 1, air might be admitted thereto so as to slightly raise the platform 14 which would decrease the weight of the wagon recorded by the scale. We entirely obviate this chance for cheating by merely securing the cylinder 18 to the frame 1, so that if the rod 19 was raised, it would not affect the weight recorded on the scale. The device is relatively simple in operation, and is not likely to easily get out of order.

The board 28 in the drawing, is shown inclined so as to make an acute angle with the plane of the frame 1. It will therefore be seen that the front wheels of the wagon or truck have a tendency to move toward the free end of the platform 14 instead of in the opposite direction, thereby securely holding the wagon in place.

We claim:—

1. A device of the type described comprising a frame having an elevating platform and a guard connected to the free end of said platform, guide members carried by said frame and being adapted to receive and to guide the free end of said guard, said guard being adapted to extend between said elevating platform and said frame when said platform is in raised position.

2. In a device of the type described, a frame, an elevating platform, means for raising said platform, a transversely extending board hingedly secured to said platform and constituting a part of said platform, and means actuated by the movement of said platform for always keeping said board inclined so as to make an angle with a vertical line through the hinge.

3. In a device of the type described, a frame, a movable platform carried by said frame, means for raising said platform, a transversely extending rod rotatably carried by said frame, large and small pinions carried by said rod, racks pivotally carried by said platform and being in mesh with said small pinions, a board hingedly secured to said platform, and a second set of racks pivotally carried by said board and being in mesh with said larger pinions, whereby said board is kept inclined when the platform is elevated.

4. A wagon truck dump comprising a frame, an elevating platform carried by said frame, a board hinged to said platform and alined with the plane of the platform when the platform is in closed position, means for swinging said board with respect to said platform when said platform is elevated whereby said board acts as a wheel stop for the vehicle disposed on the platform.

5. In combination with a weighing scale, a frame mounted thereon, two platforms carried by the frame, one of said platforms constituting a lifting element, a cylinder supported entirely by the frame, a piston working in the cylinder and operatively connected with the lifting platform, and means for admitting fluid under pressure within the cylinder to move the piston therein in a direction to elevate said lifting platform.

6. In combination with a weighing scale, a frame mounted thereon, two platforms supported by the frame, one of said platforms constituting a lifting element, a cylinder supported entirely by the frame, a piston working in the cylinder and operatively connected with the lifting platform, means for admitting fluid under pressure within the cylinder to move the piston therein in a direction to elevate said lifting platform, and means coacting with the movable platform and the frame for supporting said movable platform when raised from the frame.

7. In combination with a weighing scale, a frame mounted thereon, two platforms supported by the frame, one of said platforms constituting a lifting element, a cylinder supported entirely by the frame, a piston working in the cylinder and operatively connected with the lifting platform, means for admitting fluid under pressure within the cylinder to move the piston therein in a direction to elevate said lifting platform, racks depending from the lifting platform, and pinions rotatably carried by the frame and meshing with the racks, said racks and pinions providing a support for the movable platform when raised from the frame.

8. In combination with a weighing scale including two platforms, one of said platforms being movable with respect to the other and upon both of which a vehicle is adapted to be positioned, and pneumatic means suspended clear of the ground below for elevating said movable platform.

9. In combination with a weighing scale including two platforms, one of said platforms being movable with respect to the other and upon both of which a vehicle is adapted to be positioned, and pneumatic means supported by the scale clear of the ground below the movable platform for elevating the movable platform.

10. In combination with a weighing scale including two platforms, one of said platforms being movable with respect to the other and upon both of which a vehicle is adapted to be positioned, pneumatic means supported by the scale below said movable platform clear of the ground for elevating said movable platform, and locking means carried by one of the platforms and automatically engageable with the vehicle when the movable platform is elevated.

11. In combination with a weighing scale platform and a movable section, a fluid pressure cylinder suspended beneath said platform and a piston for said cylinder connected with said movable section for raising and lowering it independently of said scale platform.

12. A weighing scale platform having timbers and an opening above said timbers and a section of the platform fitting said opening and adapted to be raised and lowered, a cylinder supported by said timbers and depending within the space beneath the opening in said platform and connected with a source of fluid pressure supply, a piston mounted to slide within said cylinder and having its upper end connected with the under side of said section for raising and lowering it, said section being adapted to support the forward portion of a vehicle that is tilted when said section is raised.

In testimony whereof we hereunto affix our signatures.

WILLIAM GEORGE HANCOCK.
LEONARD T. STROMSWOLD.